United States Patent
Winiarski (10) Patent No.: US 11,204,916 B2
(45) Date of Patent: Dec. 21, 2021

(54) METHOD AND SYSTEM FOR IMPLEMENTING TABLE LEVEL UTILITY STORED PROCEDURES

(71) Applicant: JPMorgan Chase Bank, N.A., New York, NY (US)

(72) Inventor: Robert A. Winiarski, Valrico, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 158 days.

(21) Appl. No.: 16/183,943

(22) Filed: Nov. 8, 2018

(65) Prior Publication Data
US 2019/0138634 A1 May 9, 2019

Related U.S. Application Data

(60) Provisional application No. 62/583,563, filed on Nov. 9, 2017.

(51) Int. Cl.
*G06F 16/242* (2019.01)
*G06F 16/22* (2019.01)
*G06F 16/23* (2019.01)

(52) U.S. Cl.
CPC ........ *G06F 16/2423* (2019.01); *G06F 16/221* (2019.01); *G06F 16/2379* (2019.01)

(58) Field of Classification Search
CPC . G06F 16/2423; G06F 16/221; G06F 16/2379
See application file for complete search history.

(56) References Cited

U.S. PATENT DOCUMENTS

| | | | |
|---|---|---|---|
| 6,295,539 B1* | 9/2001 | Isip, Jr. | G06F 16/24565 |
| 6,353,820 B1* | 3/2002 | Edwards | G06F 16/2272 |
| | | | 707/696 |
| 6,571,285 B1* | 5/2003 | Groath | H04L 41/0631 |
| | | | 370/352 |
| 9,690,577 B1* | 6/2017 | Crew | G06F 11/3672 |
| 10,545,957 B1* | 1/2020 | Winiarski | G06F 16/248 |
| 2005/0071346 A1* | 3/2005 | Bernal | G06F 16/24524 |
| 2005/0160101 A1* | 7/2005 | Gallagher | G06F 16/284 |
| 2006/0069682 A1* | 3/2006 | Fanous | G06F 16/217 |
| 2016/0092505 A1* | 3/2016 | Song | G06F 16/24553 |
| | | | 707/713 |
| 2018/0018375 A1* | 1/2018 | Brunel | G06F 16/24554 |

OTHER PUBLICATIONS

Mahmood et al. "Symbolic Execution of Stored Procedures in Databased Management Systems" p. 519-528 (Year: 2016).*
CAST Function—First and only page (Year: 2015).*
www.chartio.com "Data Tutorials—How to View the Definition of a Table in IBM DB2" First and only page (Year: 2015).*
Chatio, "How to view the definition of a table in IBM DB2" (Year: 2015).*

(Continued)

*Primary Examiner* — Mark D Featherstone
*Assistant Examiner* — Kweku William Halm
(74) *Attorney, Agent, or Firm* — Hunton Andrews Kurth LLP (57) ABSTRACT

An embodiment of the present invention is directed to creating and implementing an innovative table-level stored procedure that builds and executes the necessary query dynamically based on the parameter values passed from the calling program.

14 Claims, 7 Drawing Sheets

```
File  Edit  Format  View  Help
CIFSP001 : START OF SQL STATEMENT
CIFSP001 : -->UPDATE  T_CREDIT_APPRVL_MATRIX                              <--
CIFSP001 : -->SET      CAM_AGGREGATE_IND = CAST(? AS CHAR(000001)   )     <--
CIFSP001 : -->        * CAM_PERCENT_OVR_LINE = CAST(? AS SMALLINT   )     <--
CIFSP001 : -->        * CAM_BANK_MAX_AMT_OD = CAST(? AS DECIMAL(13,02))   <--
CIFSP001 : -->        * CAM_NON_BANK_AMT_OD = CAST(? AS DECIMAL(13,02))   <--
CIFSP001 : -->WHERE    CAM_GROUP = CAST(? AS CHAR(00017)   )              <--
CIFSP001 : -->  AND    CAM_DIVISION = CAST(? AS CHAR(00017)   )           <--
CIFSP001 : -->  AND    CAM_APPROV_LVL = CAST(? AS CHAR(00003)   )         <--
CIFSP001 : -->  AND    CAM_OBL_GRD = CAST(? AS SMALLINT   )               <--
CIFSP001 : END OF SQL STATEMENT                                       510
CIFSP001 : 39000-PREPARE-SQL-STATEMENT
CIFSP001 : 39100-DESCRIBE-SQL-STATEMENT
CIFSP001 : 39150-LOAD-PARM-MARKER-ADDR
CIFSP001 : 39170-SHOW-PARM-MARKER-DATA
CIFSP001 : PARM-MARKER (00001) = COLNO (00005), CAM_AGGREGATE_IND
CIFSP001 :        DATA -->Y<--
CIFSP001 : PARM-MARKER (00002) = COLNO (00006), CAM_PERCENT_OVR_LINE
CIFSP001 :        DATA -->+00000<--
CIFSP001 : PARM-MARKER (00003) = COLNO (00007), CAM_BANK_MAX_AMT_OD
CIFSP001 :        DATA -->+000003000001.00<--
CIFSP001 : PARM-MARKER (00004) = COLNO (00008), CAM_NON_BANK_AMT_OD
CIFSP001 :        DATA -->+000003000001.00<--
CIFSP001 : PARM-MARKER (00005) = COLNO (00001), CAM_GROUP
CIFSP001 :        DATA -->SCG         <--
CIFSP001 : PARM-MARKER (00006) = COLNO (00002), CAM_DIVISION
CIFSP001 :        DATA -->IB-SCG      <--
CIFSP001 : PARM-MARKER (00007) = COLNO (00003), CAM_APPROV_LVL
CIFSP001 :        DATA -->CB <--
CIFSP001 : PARM-MARKER (00008) = COLNO (00004), CAM_OBL_GRD
CIFSP001 :        DATA -->+00010<--                                   520
CIFSP001 : 40000-FULFILL-SQL-REQUEST
CIFSP001 : 43000-EXEC-SQL-4-UPDATE
CIFSP001 : 42050-EXEC-SQL-VIA-EXECUTE
CIFSP001 : 80000-FINALIZE
```

(56) References Cited

OTHER PUBLICATIONS https://docs.oracle.com/javadb/10.10.1.2/ref/rrefsqlj33562.html hereinafter Oracle Docs (Year: 2015).*
Venkatrao et al., "SQL/CLI—A New Binding Style For SQL" SIGMOD Record, vol. 24 No. 4 Dec. 1995 (Year: 1995).*
Oracle Docs, https://docs.oracle.com/javadb/10.10.1.2/ref/rrefsqlj33562.html hereinafter Oracle Docs (Year: 2015).*
Chatio, www.Chartio.com How to view the definition of a table in IBM DB2) hereinafter Chatio (Year: 2015).*

\* cited by examiner

| File | Edit | Format | View | Help |
|---|---|---|---|---|

```
CIFSP001 : START OF SQL STATEMENT
CIFSP001 :   --> SELECT    *                                              <--
CIFSP001 :   --> FROM      T_CREDIT_APPRVL_MATRIX                         <--
CIFSP001 :   --> WHERE     CAM_GROUP = CAST(? AS CHAR(00017)  )           <--
CIFSP001 :   -->       AND CAM_DIVISION = CAST(? AS CHAR(00017) )         <--
CIFSP001 :   -->       AND CAM_APPROV_LVL = CAST(? AS CHAR(00003) )       <--
CIFSP001 :   -->       AND CAM_OBL_GRD = CAST(? AS SMALLINT  )            <--
CIFSP001 :   --> FETCH FIRST ROW ONLY WITH UR                             <--    410
CIFSP001 : END OF SQL STATEMENT
CIFSP001 : 39000-PREPARE-SQL-STATEMENT
CIFSP001 : 39100-DESCRIBE-SQL-STATEMENT
CIFSP001 : 39150-LOAD-PARM-MARKER-ADDR
CIFSP001 : 39170-SHOW-PARM-MARKER-DATA
CIFSP001 : PARM-MARKER (00001) = COLNO (00001), CAM_GROUP
CIFSP001 :             DATA --> SCG                    <--
CIFSP001 : PARM-MARKER (00002) = COLNO (00002), CAM_DIVISION
CIFSP001 :             DATA --> IB-SCG                 <--
CIFSP001 : PARM-MARKER (00003) = COLNO (00003), CAM_APPROV_LVL
CIFSP001 :             DATA --> CB                     <--
CIFSP001 : PARM-MARKER (00004) = COLNO (00004), CAM_OBL_GRD
CIFSP001 :             DATA --> +00001                 <--       420
CIFSP001 : 40000-FULFILL-SQL-REQUEST
CIFSP001 : 41000-EXEC-SQL-4-SELECT
CIFSP001 : 41100-OPEN-DYNAMIC-CSR
CIFSP001 : 41150-FETCH-DYNAMIC-CSR
CIFSP001 : ROW FETCHED
CIFSP001 : CAM_GROUP        --> SCG
CIFSP001 : CAM_DIVISION     --> IB-SCG
CIFSP001 : CAM_APPROV_LVL   --> CB                     <--
CIFSP001 : CAM_OBL_GRD      --> +00001                 <--
CIFSP001 : CAM_AGGREGATE_IND--> Y                      <--
CIFSP001 : CAM_PERCENT_OVR_LINE--> +00000              <--
CIFSP001 : CAM_BANK_MAX_AMT_OD--> +00000300000.00      <--       430
CIFSP001 : CAM_NON_BANK_AMT_OD--> +00000300000.00      <--
CIFSP001 : 41120-CLOSE-DYNAMIC-CSR
CIFSP001 : 90000-FINALIZE
```

Figure 4

| File | Edit | Format | View | Help |
|------|------|--------|------|------|

```
CIFSP001 : START OF SQL STATEMENT
CIFSP001 :   --> UPDATE  T_CREDIT_APPRVL_MATRIX
CIFSP001 :   --> SET     CAM_AGGREGATE_IND = CAST(? AS CHAR(000001)    )       <--
CIFSP001 :   -->      *  CAM_PERCENT_OVR_LINE = CAST(? AS SMALLINT    )         <--
CIFSP001 :   -->      *  CAM_BANK_MAX_AMT_OD = CAST(? AS DECIMAL(13,02))        <--
CIFSP001 :   -->      *  CAM_NON_BANK_AMT_OD = CAST(? AS DECIMAL(13,02))        <--  510
CIFSP001 :   --> WHERE   CAM_GROUP = CAST(? AS CHAR(00017)    )                 <--
CIFSP001 :   --> AND     CAM_DIVISION = CAST(? AS CHAR(00017)    )              <--
CIFSP001 :   --> AND     CAM_APPROV_LVL = CAST(? AS CHAR(00003)    )            <--
CIFSP001 :   --> AND     CAM_OBL_GRD = CAST(? AS SMALLINT    )                  <--
CIFSP001 : END OF SQL STATEMENT
CIFSP001 : 39000-PREPARE-SQL-STATEMENT
CIFSP001 : 39100-DESCRIBE-SQL-STATEMENT
CIFSP001 : 39150-LOAD-PARM-MARKER-ADDR
CIFSP001 : 39170-SHOW-PARM-MARKER-DATA
CIFSP001 : PARM-MARKER (00001) = COLNO (00005), CAM_AGGREGATE_IND
CIFSP001 :       DATA -->Y<--
CIFSP001 : PARM-MARKER (00002) = COLNO (00006), CAM_PERCENT_OVR_LINE
CIFSP001 :       DATA -->+00000<--
CIFSP001 : PARM-MARKER (00003) = COLNO (00007), CAM_BANK_MAX_AMT_OD
CIFSP001 :       DATA -->+000003000001.00<--                                          520
CIFSP001 : PARM-MARKER (00004) = COLNO (00008), CAM_NON_BANK_AMT_OD
CIFSP001 :       DATA -->+000003000001.00<--
CIFSP001 : PARM-MARKER (00005) = COLNO (00001), CAM_GROUP
CIFSP001 :       DATA -->SCG          <--
CIFSP001 : PARM-MARKER (00006) = COLNO (00002), CAM_DIVISION
CIFSP001 :       DATA -->IB-SCG       <--
CIFSP001 : PARM-MARKER (00007) = COLNO (00003), CAM_APPROV_LVL
CIFSP001 :       DATA -->CB <--
CIFSP001 : PARM-MARKER (00008) = COLNO (00004), CAM_OBL_GRD
CIFSP001 :       DATA -->+00010<--
CIFSP001 : 40000-FULFILL-SQL-REQUEST
CIFSP001 : 43000-EXEC-SQL-4-UPDATE
CIFSP001 : 42050-EXEC-SQL-VIA-EXECUTE
CIFSP001 : 90000-FINALIZE
```

Figure 5

```
CIFSP001 : START OF SQL STATEMENT
CIFSP001 : -->INSERT                                          <--
CIFSP001 : -->INTO     T_CREDIT_APPRVL_MATRIX                 <--
CIFSP001 : -->(    CAM_GROUP                                  <--
CIFSP001 : -->   * CAM_DIVISION                               <--
CIFSP001 : -->   * CAM_APPROV_LVL                             <--
CIFSP001 : -->   * CAM_OBL_GRD                                <--
CIFSP001 : -->   * CAM_AGGREGATE_IND                          <--
CIFSP001 : -->   * CAM_PERCENT_OVR_LINE                       <--
CIFSP001 : -->   * CAM_BANK_MAX_AMT_OD                        <--
CIFSP001 : -->   * CAM_NON_BANK_AMT_OD                        <--
CIFSP001 : -->)                                               <--
CIFSP001 : -->VALUES                                          <--
CIFSP001 : -->(    CAST(? AS CHAR(00017)    )                 <--
CIFSP001 : -->   * CAST(? AS CHAR(00017)    )                 <--
CIFSP001 : -->   * CAST(? AS CHAR(00003)    )                 <--
CIFSP001 : -->   * CAST(? AS SMALLINT       )                 <--
CIFSP001 : -->   * CAST(? AS CHAR(00001)    )                 <--
CIFSP001 : -->   * CAST(? AS SMALLINT       )                 <--
CIFSP001 : -->   * CAST(? AS DECIMAL (13,02))                 <--
CIFSP001 : -->   * CAST(? AS DECIMAL (13,02))                 <--
CIFSP001 : -->)                                               <--
CIFSP001 : END OF SQL STATEMENT
CIFSP001 : 39000-PREPARE-SQL-STATEMENT                              610
CIFSP001 : 39100-DESCRIBE-SQL-STATEMENT
CIFSP001 : 39150-LOAD-PARM-MARKER-ADDR
CIFSP001 : 39170-SHOW-PARM-MARKER-DATA                              620
CIFSP001 : PARM-MARKER (00001) = COLNO (00001), CAM_GROUP
CIFSP001 :       DATA -->TESTING           <--
CIFSP001 : PARM-MARKER (00002) = COLNO (00002), CAM_DIVISION
CIFSP001 :       DATA -->TESTING-123       <--
CIFSP001 : PARM-MARKER (00003) = COLNO (00003), CAM_APPRVL_LVL
CIFSP001 :       DATA -->XYZ<--
CIFSP001 : PARM-MARKER (00004) = COLNO (00004), CAM_OBL_GRD
CIFSP001 :       DATA -->+00001<--
CIFSP001 : PARM-MARKER (00005) = COLNO (00005), CAM_AGGREGATE_IND
CIFSP001 :       DATA -->Y<--
CIFSP001 : PARM-MARKER (00006) = COLNO (00006), CAM_PERCENT_OVR_LINE
CIFSP001 :       DATA -->+00000<--
CIFSP001 : PARM-MARKER (00007) = COLNO (00007), CAM_BANK_MAX_AMT_OD
CIFSP001 :       DATA -->+00005000000.00<--
CIFSP001 : PARM-MARKER (00008) = COLNO (00008), CAM_NON_BANK_AMT_OD
CIFSP001 :       DATA -->+00005000000.00<--
CIFSP001 : 40000-FULFILL-SQL-REQUEST
CIFSP001 : 43000-EXEC-SQL-4-INSERT
CIFSP001 : 42050-EXEC-SQL-VIA-EXECUTE
CIFSP001 : 90000-FINALIZE
```

Figure 6

| File | Edit | Format | View | Help | | |
|---|---|---|---|---|---|---|
| CIFSP001 | : | START OF SQL STATEMENT | | | | |
| CIFSP001 | : | --> | DELETE | T_CREDIT_APPRVL_MATRIX | | |
| CIFSP001 | : | --> | FROM | | | |
| CIFSP001 | : | --> | WHERE | CAM_GROUP = CAST(? AS CHAR(00017) ) | | |
| CIFSP001 | : | --> | AND | CAM_DIVISION = CAST(? AS CHAR(00017) ) | | |
| CIFSP001 | : | --> | AND | CAM_APPROV_LVL = CAST(? AS CHAR(00003) ) | | |
| CIFSP001 | : | --> | AND | CAM_OBL_GRD = CAST(? AS SMALLINT ) | | |
| CIFSP001 | : | END OF SQL STATEMENT | | | | |
| CIFSP001 | : | 39000-PREPARE-SQL-STATEMENT | | | | |
| CIFSP001 | : | 39100-DESCRIBE-SQL-STATEMENT | | | | |
| CIFSP001 | : | 39150-LOAD-PARM-MARKER-ADDR | | | | |
| CIFSP001 | : | 39170-SHOW-PARM-MARKER-DATA | | | | |
| CIFSP001 | : | PARM-MARKER (00001) = COLNO (00001), CAM_GROUP | | | | |
| CIFSP001 | : | DATA -->TESTING<-- | | | | |
| CIFSP001 | : | PARM-MARKER (00002) = COLNO (00002), CAM_DIVISION | | | | |
| CIFSP001 | : | DATA -->TESTING-123 | | | | |
| CIFSP001 | : | PARM-MARKER (00003) = COLNO (00003), CAM_APPROV_LVL | | | | |
| CIFSP001 | : | DATA -->XYZ<-- | | | | |
| CIFSP001 | : | PARM-MARKER (00004) = COLNO (00004), CAM_OBL_GRD | | | | |
| CIFSP001 | : | DATA -->+00001<-- | | | | |
| CIFSP001 | : | 40000-FULFILL-SQL-REQUEST | | | | |
| CIFSP001 | : | 44000-EXEC-SQL-4-DELETE | | | | |
| CIFSP001 | : | 42050-EXEC-SQL-VIA-EXECUTE | | | | |
| CIFSP001 | : | 90000-FINALIZE | | | | |

Figure 7

METHOD AND SYSTEM FOR IMPLEMENTING TABLE LEVEL UTILITY STORED PROCEDURES

CROSS REFERENCE TO RELATED APPLICATIONS

The application claims priority to U.S. Provisional Application 62/583,563, filed Nov. 9, 2017, the contents of which are incorporated herein in its entirety.

This application is related to application U.S. Ser. No. 15/643,569, filed Jul. 7, 2017, which claims priority to U.S. Provisional Application 62/359,774, filed Jul. 8, 2016, the contents of which are incorporated herein in their entirety.

This application is also related to application U.S. Ser. No. 15/790,376, filed Oct. 23, 2017, which claims priority to U.S. Provisional Application 62/411,083, filed Oct. 21, 2016, the contents of which are incorporated herein in their entirety.

FIELD OF THE INVENTION

The present invention generally relates to an innovative framework that implements a table level stored procedure that builds and executes queries dynamically based on parameter values from a calling program.

BACKGROUND OF THE INVENTION

Generally, action-level stored procedures handle the business logic for any particular CICS screen. Customer Information Control System (CICS) is a family of mixed language application servers that provide online transaction management and connectivity for applications on IBM Mainframe systems under z/OS and z/VSE. CICS is middleware designed to support rapid, high-volume online transaction processing. While the action-level program may use a number of database tables, such as DB2 tables, there is usually a main table for that screen where other DB2 tables play supporting roles. Whenever a user needs to perform a Select/Update/Insert/Delete action on a specific row from the main table, the action-level program may call a table-level stored procedure. Generally speaking, each action-level program has a corresponding table-level program that is dedicated to a single DB2 table. Every time a programmer, software engineer or other application development team member has a change to one of the DB2 tables, the user would need to perform maintenance on its corresponding table-level stored procedure. Every time a new DB2 table is created, another brand new table-level stored procedure dedicated to the new table would need to be created. This results in an ever-increasing number of programs that needed to be maintained and tested.

These and other drawbacks exist.

SUMMARY OF THE INVENTION

Accordingly, one aspect of the invention is to address one or more of the drawbacks set forth above. According to an embodiment of the present invention, a computer implemented system that implements a table level stored procedure tool. The system comprises: a memory interface that accesses a database table; an input that receives a user input; a computer processor, coupled to the memory interface and the input, the processor configured to perform the steps comprising: retrieve input parameters from a calling program, wherein the input parameters comprise a table identifier; identify, using the table identifier, column properties of a table associated with the table identifier, the column properties comprise position, length and data type; identify parameter markers; dynamically build a query based on the parameter markers and input parameters; execute the query on the table; and return data, via an interface, to the calling program.

According to another embodiment of the present invention, a computer implemented method implements a Table Level Stored Procedure Tool. The method comprises the steps of: retrieving, via an electronic input, input parameters from a calling program, wherein the input parameters comprise a table identifier; identifying, using the table identifier, column properties of a table associated with the table identifier, the column properties comprise position, length and data type; identifying, via a computer processor, parameter markers; dynamically building, via a computer processor, a query based on the parameter markers and input parameters; executing, via a computer processor, the query on the table; and returning data, via an interface, to the calling program.

The computer implemented system, method and medium described herein provide unique advantages to entities, organizations and other users (e.g., developers, quality assurance teams, testing departments, etc.), according to various embodiments of the invention. The innovative system and method realize various benefits, including eliminating the need to create a table-level stored procedure every time a programmer, software engineer or other application development team member creates a new database table, e.g., DB2 table. In addition, the system eliminates the need to modify a table-level stored procedure when the structure of the underlying DB2 table changes (e.g., columns are updated, added, delete, etc.). According, the various embodiments of the present invention provides increased flexibility, reduced development and maintenance time as well as increased speed-to-market. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 4 is an exemplary illustration of dynamic table-level stored procedure interface, according to an embodiment of the present invention.

FIG. 5 is an exemplary illustration of dynamic table-level stored procedure interface, according to an embodiment of the present invention.

FIG. 6 is an exemplary illustration of dynamic table-level stored procedure interface, according to an embodiment of the present invention.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

There is very little commonality among the action-level stored procedures due to the unique business requirements of each CICS screen. However, an embodiment of the present invention recognizes that the table-level stored procedures are strikingly similar. Even though the underlying database table, e.g., DB2 table, is different in each case, the overall process is similar, if not virtually identical.

An embodiment of the present invention is directed to creating a new table-level stored procedure that builds and executes a query dynamically based on parameter values passed from a calling program. The innovative system realizes various benefits, including eliminating the need to create a table-level stored procedure every time a programmer, software engineer or other application development team member creates a new DB2 table, as long as standard requirements are in use. In addition, the system eliminates the need to modify a table-level stored procedure when the structure of the underlying DB2 table changes (e.g., columns are added to or deleted from the table). The innovative system provides increased flexibility, reduced development and maintenance time as well as increased speed-to-market. A Table Level Stored Procedure Tool of an embodiment of the present invention realizes significant improvements over the original process that required a dedicated table-level stored procedure for each database table, e.g., DB2 table.

Figure 1:
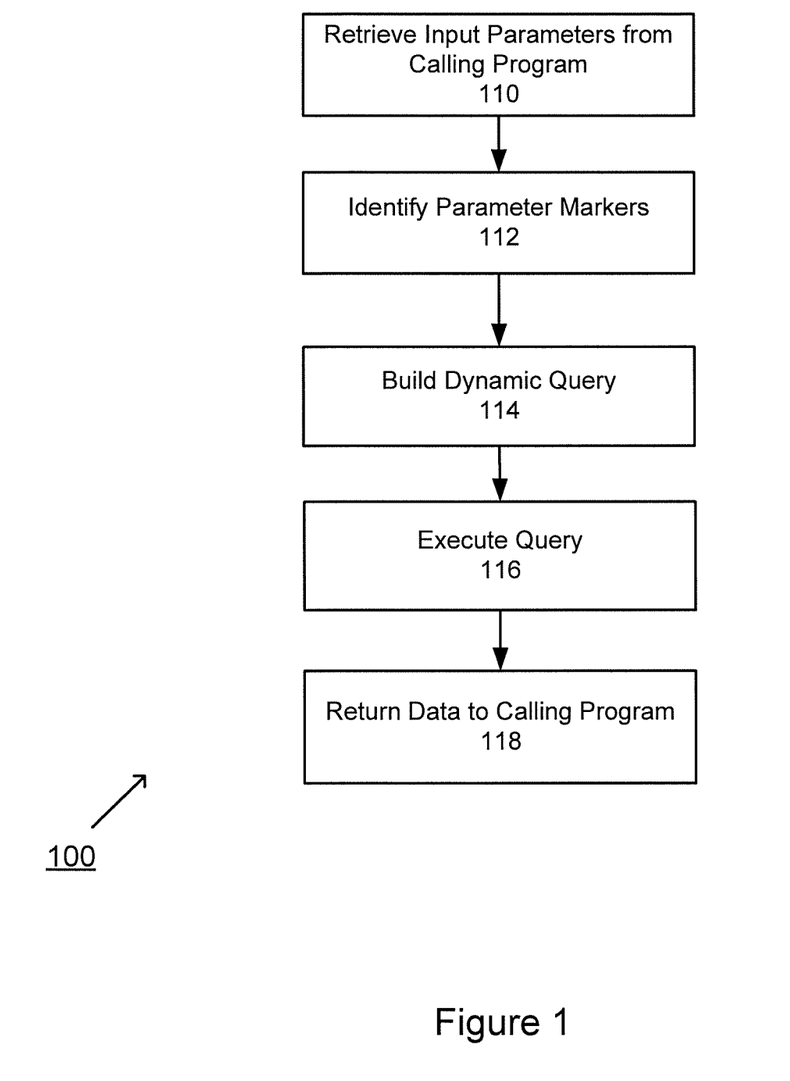
FIG. 1 is an exemplary flowchart for implementing a dynamic table-level stored procedure, according to an embodiment of the present invention.

FIG. 1 is an exemplary flowchart for implementing a dynamic table-level stored procedure, according to an embodiment of the present invention. At step 110, the system may retrieve input parameters from a calling program. At step 112, the system may identify parameter markers. At step 114, the system may dynamically build a query. At step 116, the system may then execute the cursor dynamically. At step 118, data may be returned to the calling program. The order illustrated in FIG. 1 is merely exemplary. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Each step is discussed in further detail below.

At step 110, the system may retrieve input parameters from a calling program. For example, a Table Level Stored Procedure Tool may use a parameter list. Instead of functioning as simply a "router" program that calls another program, an embodiment of the present invention may build and execute the necessary query itself. Other programs may call a stored procedure directly. For example, the Table Level Stored Procedure Tool may identify the table to use based on the value of an input parameter, such as a TBL-CODE input parameter. Once the Table Level Stored Procedure Tool has identified the table name, the next step is to get information about its columns. This may be achieved through a command, such as a DESCRIBE TABLE command. This command may populate an SQLDA (SQL Descriptor Area) with the properties of the columns in the table. The Table Level Stored Procedure Tool may use the information from this SQLDA to analyze the data in an input parameter, e.g., IO-DATA. This may determine position, length, data type, and so on for each column in the table. It may also be the basis of validating the IO-DATA before a query is executed.

At step 112, the system may identify parameter markers. An embodiment of the present invention retrieves data about the target table from system-level catalog (SYSIBM) tables dynamically. Accordingly, there is no need to modify the Table Level Stored Procedure Tool simply because the underlying table changes. The innovative system realizes a tremendous savings of time and effort both for application developers (AD) and for the testing teams that would need to validate the changes.

At step 114, the system may dynamically build a query. The Table Level Stored Procedure Tool may build an appropriate query (e.g., Select/Insert/Update/Delete) based on input parameter REQ-TYPE. The Table Level Stored Procedure Tool may use other SYSIBM tables (e.g., SYSKEYS, SYSINDEXES) in order to determine which columns are needed in the WHERE clause of the SQL statement.

At step 116, the system may then execute the cursor dynamically. The stored procedure may prepare a dynamic query using Parameter Markers which are contained in a second SQLDA. By using Parameter Markers, the system may take advantage of a Dynamic Statement Cache feature in order to improve performance.

At step 118, data may be returned to the calling program. Once the query executes, data may be returned to the calling program. Through a combination of dynamic SQL and DB2 commands, the Table Level Stored Procedure Tool does not need to know anything ahead of time about the DB2 table, its data, or the request from the calling program.

For example, applications may have a number of DB2 tables with a "parent/child" relationship. An embodiment of the present invention may handle requests for data one row at a time, per table. Another embodiment of the present invention may process related records from the parent/child tables at a single time. For example, the system may process and/or update one record at a time as well as process and/or update multiple records.

A stored procedure may represent a specialized program. A stored procedure may represent a compiled program that can execute SQL statements and is stored at a local or remote database server. For example, an entity may manage a customer information facility that provides data warehousing, where many different applications call various stored procedures. For example, an application may execute a stored procedure to retrieve a name and an address for a set of accounts by passing account identifiers. According to an exemplary illustration, the entity may execute 50, 60, 70 stored procedures on thousands and thousands of test cases.

For example, a stored procedure may be invoked from an application program or from the command line processor. A single call to a stored procedure from a client application may access the database at the server several times. A typical stored procedure may contain two or more SQL statements and some manipulative or logical processing in a host language or SQL procedure statements. Stored procedures may be called from other applications or from the command line.

For each test case, the system may call an appropriate stored procedure using the specified parameters. The program may display the test result output in addition to any available result sets, e.g., DB2 Result Sets, that the stored procedure creates. The results may then be saved by the user for documentation and/or auditing purposes, etc. Also, the results may be exported to another application, communicated to recipients, programs, systems, and further available for download by a user. Result sets may represent information from different tables, sources, etc. Also, result sets may represent results of a stored procedure in a particular format and may be further filtered or processed. For example, the stored procedure may process the result sets and display the information in an audit trail or other output.

According to an embodiment, the system may include an interactive user interface that may be accessible through various user devices, computer, laptop, smartphone, mobile devices, etc. The interface may include a web front-end to view and access ready-to-use cursors. With this feature, users may view predetermined ready-to-use cursors that may be generated and applied in real-time. The interface may also demonstrate the required input values for each cursor and provide sample output data. Additional details are provided in and commonly owned patent application U.S. Ser. No. 15/790,376, filed Oct. 23, 2017, which claims priority to U.S. Provisional Application 62/411,083, filed Oct. 21, 2016, the contents of which are incorporated herein in their entirety.

Figure 2:
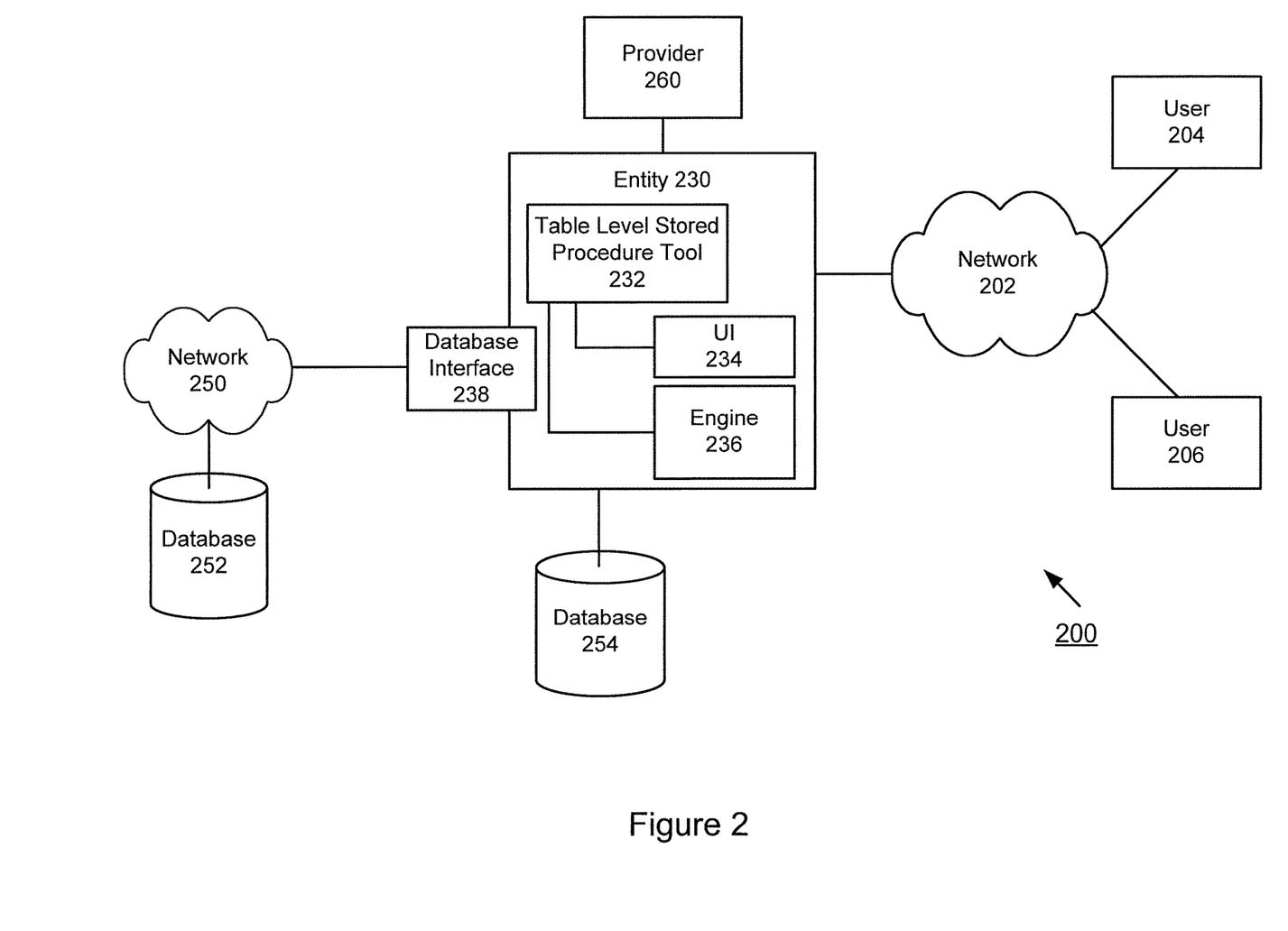
FIG. 2 is an exemplary system diagram for implementing a dynamic table-level stored procedure, according to an embodiment of the present invention.

FIG. 2 is an exemplary system diagram for implementing a Table Level Stored Procedure Tool, according to an embodiment of the present invention. As illustrated in FIG. 2, Network 202 may be communicatively coupled with one or more data devices including, for example, computing devices associated with end users, represented by User 204, 206. Such devices may include mobile devices, including mobile phones, smart devices, etc. Entity 230 may include a Table Level Stored Procedure Tool 232 that automates and facilitates execution of table level stored procedures in accordance with the various embodiments of the present invention. Table Level Stored Procedure Tool 232 may also incorporate modules and other functions, such as User Interface 234, Engine 236 and Database Interface 238. These modules are exemplary and illustrative, Table Level Stored Procedure Tool 232 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Stored procedures may be stored and maintained by Databases 252, 254. For example, Database 252 may maintain stored procedures and corresponding parameters for each stored procedure at a remote location, accessible by Network 250. Database 252 may receive updates, revisions, requests and/or other actions on the data stored via Database Interface 234. The updates may be automatically implemented from various sources, applications, and systems. Also, Databases 252, 254 may also store and maintain output data in various formats as well as reports, performance data, etc. The Table Level Stored Procedure Tool described herein may be provided by Entity 230 and/or a third party provider, represented by 260, where Provider 260 may operate with Entity 230.

The system 200 of FIG. 1 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 is depicted, it should be appreciated that other connections and relationships are possible. The system 200 described below may be used to implement the various methods herein, by way of example. Various elements of the system 100 may be referenced in explaining the exemplary methods described herein.

Network 202, 250 may be a wireless network, a wired network or any combination of wireless network and wired network. For example, Network 202, 250 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 202, 250 may support an Internet network, a wireless communication network, a cellular network, Bluetooth, or the like, or any combination thereof. Network 202, 250 may further include one, or any number of the exemplary types of networks mentioned above operating as a stand-alone network or in cooperation with each other. Network 202, 250 may utilize one or more protocols of one or more network elements to which it is communicatively coupled. Network 202, 250 may translate to or from other protocols to one or more protocols of network devices. Although Network 202 and 250 are each depicted as one network for simplicity, it should be appreciated that according to one or more embodiments, Network 202, 250 may comprise a plurality of interconnected networks, such as, for example, a service provider network, the Internet, a cellular network, corporate networks, or even home networks, or any of the types of networks mentioned above.

Data may be transmitted and received via Network 202, 250 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 2 illustrates individual devices or components, it should be appreciated that there may be several of such devices to carry out the various exemplary embodiments. Entity 230 may communicate using any mobile or computing device, such as a laptop computer, a personal digital assistant, a smartphone, a smartwatch, smart glasses, other wearables or other computing devices capable of sending or receiving network signals. User devices may have an application installed that is associated with Entity 230.

Entity 230 may be communicatively coupled to Databases 252, 254, via Database Interface 234. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 202, or communications may involve a direct connection between the various storage components and Entity 230, as depicted in FIG. 2. The storage components may also represent cloud or other network based storage.

Figure 3:
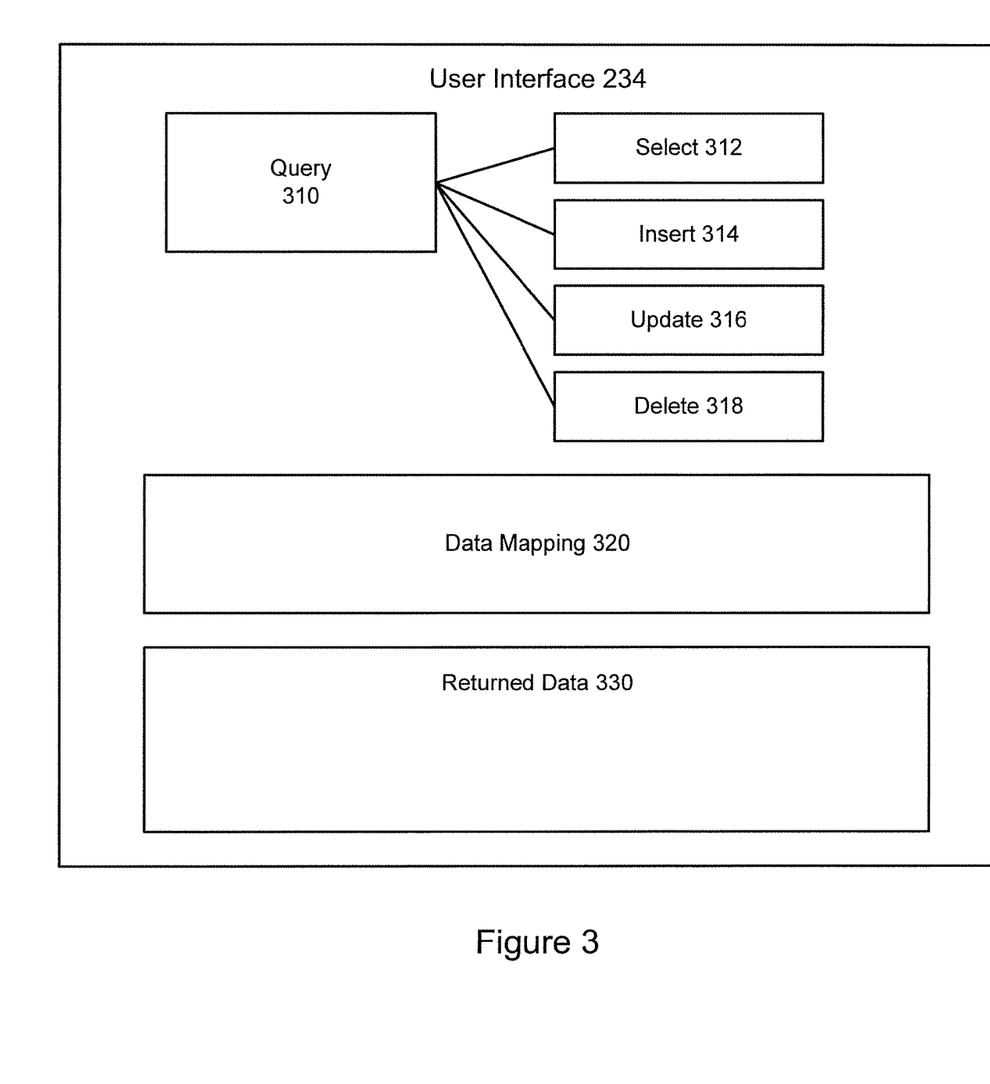
FIG. 3 is an exemplary illustration of dynamic table-level stored procedure interface, according to an embodiment of the present invention.

FIG. 3 is an exemplary illustration of a table level stored procedure tool interface, according to an embodiment of the present invention. User Interface 234 may be accessible via a mobile device, desktop device and other computing device, processor or system. An embodiment of the present invention is directed to a web front-end that facilitates execution of table level stored procedures. User Interface 234 may include various modules that perform functions relating to building and executing queries dynamically. In this example, Query 310 may include Select 312, Insert 314, Update 316 and Delete 318. Other queries and functions may be applied. Query 310 may include parameter markers. Data Mapping 320 may represent a mapping between the parameter markers and real values. Data Mapping 320 shows actual values that are mapped to each Typed Parameter Marker when a query statement executes. Interface 300 may also provide the returned data, at 330. The returned data may be retrieved from a corresponding database, e.g., database table.

Other values/features may be displayed. These modules are exemplary and illustrative, the User Interface may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

An embodiment of the present invention is directed to SQL statements that perform functions, including Select, Insert, Update, and Delete SQL statements. FIGS. 4-8 illustrates Select, Insert, Update and Delete SQL statements taken from an exemplary dedicated table-level stored procedure.

FIG. 4 is an exemplary illustration of dynamic table-level stored procedure interface, according to an embodiment of the present invention. FIG. 4 is an exemplary SELECT statement, according to an embodiment of the present invention. In the example of FIG. 4, the term "CIFSP001" represent a Table Level Stored Procedure Tool of an embodiment of the present invention. As shown in FIG. 4, a Select query (as shown by 410) represents an actual SQL statement that is created for the table in question. Each CAST statement is known as a Typed Parameter Marker that tells DB2 that an embodiment of the present invention is using a Dynamic Statement Cache feature in order to enhance performance. In this example, the symbol "?" represents a parameter marker. The highlighted fields (as shown in 420) show the actual values that are mapped to each Typed Parameter Marker when the statement executes. FIG. 4 further shows the data returned by the Select statement at 430. The name of each column may be displayed along with its corresponding data.

FIG. 5 is an exemplary illustration of dynamic table-level stored procedure interface, according to an embodiment of the present invention. FIG. 5 is an exemplary UPDATE statement, according to an embodiment of the present invention. As shown in FIG. 5, an Update query (as shown by 510) represents an actual SQL statement that is created for the table in question. Each CAST statement is known as a Typed Parameter Marker that tells DB2 that an embodiment of the present invention is using a Dynamic Statement Cache feature in order to enhance performance. The highlighted fields (as shown in 520) show the actual values that are mapped to each Typed Parameter Marker when the statement executes.

FIG. 6 is an exemplary illustration of dynamic table-level stored procedure interface, according to an embodiment of the present invention. FIG. 6 is an exemplary INSERT statement, according to an embodiment of the present invention. As shown in FIG. 6, an Insert query (as shown by 610) represents an actual SQL statement that is created for the table in question. Each CAST statement is known as a Typed Parameter Marker that tells DB2 that an embodiment of the present invention is using a Dynamic Statement Cache feature in order to enhance performance. The highlighted fields (as shown in 620) show the actual values that are mapped to each Typed Parameter Marker when the statement executes.

Figure 7:
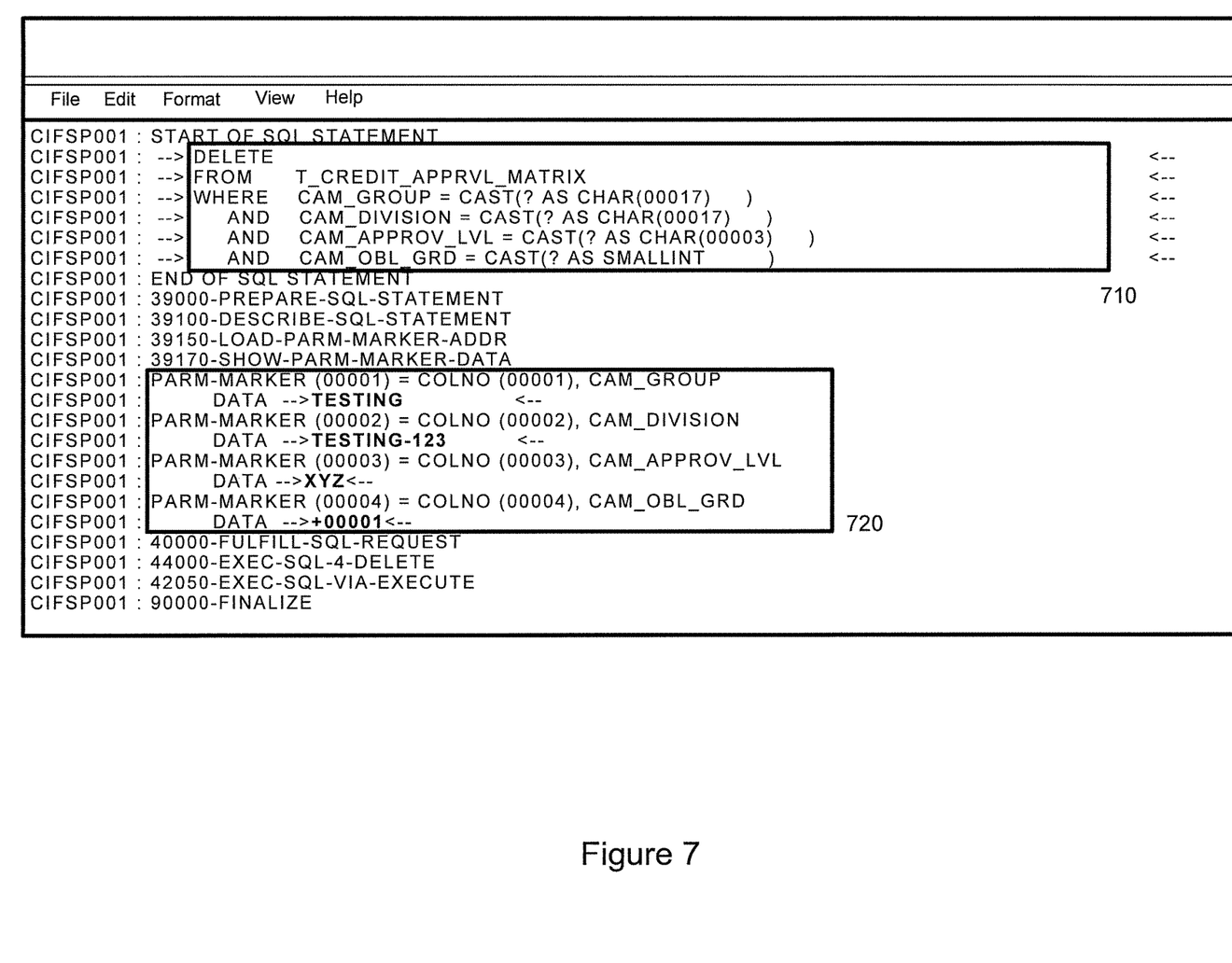
FIG. 7 is an exemplary illustration of dynamic table-level stored procedure interface, according to an embodiment of the present invention.

FIG. 7 is an exemplary illustration of dynamic table-level stored procedure interface, according to an embodiment of the present invention. FIG. 7 is an exemplary DELETE statement, according to an embodiment of the present invention. As shown in FIG. 7, a Delete query (as shown by 710) represents an actual SQL statement that is created for the table in question. Each CAST statement is known as a Typed Parameter Marker that tells DB2 that an embodiment of the present invention is using its Dynamic Statement Cache feature in order to enhance performance. The highlighted fields (as shown in 720) show the actual values that are mapped to each Typed Parameter Marker when the statement executes.

An embodiment of the present invention may include adding an ability to skip data validations. By default, a Table Level Stored Procedure Tool may perform data-type validations as follows: INSERT or UPDATE statement: validate data for every column of the table in question. SELECT or DELETE statement: validate data for every column in the WHERE clause of the query. There are some cases where the program calling the Table Level Stored Procedure Tool has already performed data-type validations so there is no need for the Table Level Stored Procedure Tool to repeat the process. When this is true, an embodiment of the present invention increases performance by programming the Table Level Stored Procedure Tool to not perform these validations—especially on tables that have many columns.

An embodiment of the present invention may include adding the ability to select certain columns or update certain columns. For example, a Table Level Stored Procedure Tool may return every column in a table for a Select statement. It may also update every column that is not part of a primary index for an Update statement. An embodiment of the present invention may improve performance by acting on a subset of the table, e.g., set of columns, only the required columns, etc. This may involve the calling program informing the Table Level Stored Procedure Tool which columns are of interest.

A Table Level Stored Procedure Tool may replace dedicated table-level stored procedures and may also be used in batch programs as well.

An embodiment of the present invention may factor out a set of Select/Insert/Update/Delete SQL statements from individual batch programs. In this example, a Table Level Stored Procedure Tool makes a difference by reducing maintenance and testing whenever database and application changes are made.

For example, an exemplary job may be responsible for loading a table (e.g., T_SAP_COST_CENTER (SCC) table) with data provided by a partner application. The exemplary job may execute a program which functions as a driver program. Accordingly, a Table Level Stored Procedure Tool may be called to insert the rows into the SCC table. In this example, each of the over 700,000 rows inserted into the table may be performed by the Table Level Stored Procedure Tool.

The driver program may represent a program that calls a Table Level Stored Procedure Tool. In this example, the driver program may read a file containing the 700,000 records that end up being inserted into the SCC table. Each time the driver program reads an input record it would load the data into the input parameters, and then call the Table Level Stored Procedure Tool, which then performs the required functions and then returns to the calling program for the next iteration. The process would continue until all the input records in the file are read.

According to another example, a program may purge outdated rows from several tables and insert rows into one or more other tables In this example, the program may call the Table Level Stored Procedure Tool to handle the actual delete and insert functions.

According to another example, in an exemplary step, a job may execute a program which purges outdated rows from two tables and inserts rows into a third. The program also calls the Table Level Stored Procedure Tool to handle the actual delete and insert functions.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that implements a Table Level Stored Procedure Tool, the system comprising:
   a memory interface that accesses a DB2 database table;
   an input that receives a user input;
   a computer processor, coupled to the memory interface and the input, the processor configured to perform the steps comprising:
   retrieve input parameters from a calling program, wherein the input parameters comprise a table identifier and a required query type;
   identify a DB2 table to use based on the table identifier;
   execute a describe table command to populate a SQL Descriptor Area with column properties of the identified DB2 table;
   analyze the data of one or more of the retrieved input parameters to determine a position, a length, and a data type for each column in the DB2 table associated with the table identifier;
   validate the input parameters based on the populated SQL Descriptor Area prior to executing a query;
   identify parameter markers provided by the calling program;
   determine a type of dynamic query to build based on the required query type input parameter, the types of dynamic queries comprising a select query, an insert query, an update query, and a delete query;
   dynamically build the dynamic query using one or more system-level catalog (SYSIBM) tables to determine which columns of the DB2 table are needed in a WHERE clause of a SQL statement in the dynamically built query, the dynamic query comprising a series of SQL statements to achieve the required query type and including one or more typed parameter markers with a "?" symbol representing a parameter marker and indicating to a DB2 table that the query is using a dynamic statement cache;
   execute the dynamically built query on the DB2 table by referencing the dynamic statement cache to map each of the one or more typed parameter markers to real values;
   display, via a dynamic table-level stored procedure interface, the dynamically built dynamic query including the series of SQL statements including the one or more typed parameter markers as well as the real values mapped to each of the one or more typed parameter markers; and
   return data, via an interface, to the calling program.

2. The computer implemented system of claim 1, wherein the table represents a plurality of related parent-child tables.

3. The computer implemented system of claim 1, wherein the parameter marker is represented by a CAST statement.

4. The computer implemented system of claim 1, wherein the Table Level Stored Procedure Tool is programmed to skip data validations.

5. The computer implemented system of claim 1, wherein the Table Level Stored Procedure Tool is programmed to select a subset of the table to act on.

6. The computer implemented system of claim 5, wherein the subset of the table comprises a plurality of identified columns.

7. The computer implemented system of claim 1, wherein Table Level Stored Procedure Tool is programmed purge one or more outdated rows.

8. A computer implemented method that implements a Table Level Stored Procedure Tool, the method comprising the steps of:
   retrieving, via an electronic input, input parameters from a calling program, wherein the input parameters comprise a table identifier and a required query type;
   identifying a DB2 table to use based on the table identifier;
   executing a describe table command to populate a SQL Descriptor Area with column properties of the identified DB2 table;
   analyzing the data of one or more of the retrieved input parameters to determine position, length, and data type for each column in the DB2 table associated with the table identifier;
   validating the input parameters based on the populated SQL Descriptor Area prior to executing a query;
   identifying, via a computer processor, parameter markers provided by the calling program;
   determining a type of dynamic query to build based on the required query type input parameter, the types of dynamic queries comprising a select query, an insert query, an update query, and a delete query;
   dynamically building, via a computer processor, the dynamic query using one or more system-level catalog (SYSIBM) tables to determine which columns of the DB2 table are needed in a WHERE clause of a SQL statement in the dynamically built query, the dynamic query comprising a series of SQL statements to achieve the required query type and including one or more typed parameter markers with a "?" symbol representing a parameter marker and indicating to a DB2 table that the query is using a dynamic statement cache;
   executing, via a computer processor, the dynamically built query on the DB2 table by referencing the dynamic statement cache to map each of the one or more typed parameter markers to real values;
   displaying, via a dynamic table-level stored procedure interface, the dynamically built dynamic query including the series of SQL statements including the one or more typed parameter markers as well as the real values mapped to each of the one or more typed parameter markers; and
   returning data, via an interface, to the calling program.

9. The computer implemented method of claim 8, wherein the table represents a plurality of related parent-child tables.

10. The computer implemented method of claim 8, wherein the parameter marker is represented by a CAST statement.

11. The computer implemented method of claim 8, wherein the Table Level Stored Procedure Tool is programmed to skip data validations.

12. The computer implemented method of claim 8, wherein the Table Level Stored Procedure Tool is programmed to select a subset of the table to act on.

13. The computer implemented method of claim 12, wherein the subset of the table comprises a plurality of identified columns.

14. The computer implemented method of claim 8, wherein Table Level Stored Procedure Tool is programmed purge one or more outdated rows.

\* \* \* \* \*